May 11, 1926. 1,583,794
F. E. PARSONS
EYESHADE
Filed Oct. 8, 1923
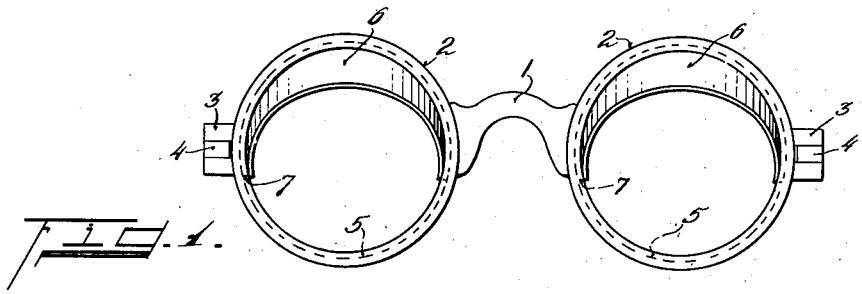
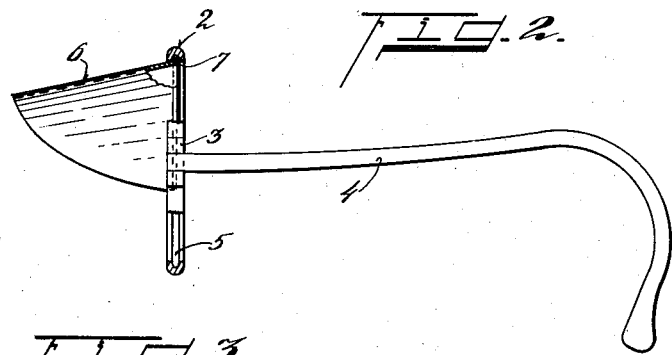
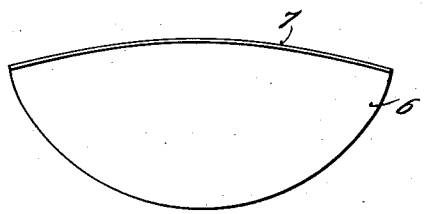
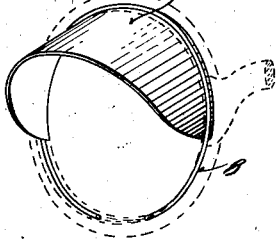
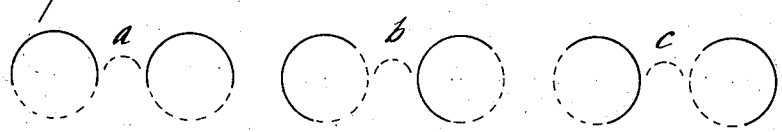
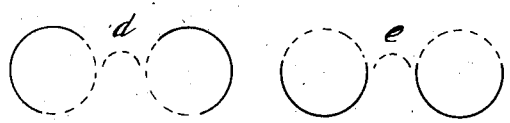
INVENTOR.
Frederick E. Parsons
BY
Clarence B. Foster ATTORNEY Patented May 11, 1926.

1,583,794

UNITED STATES PATENT OFFICE.

FREDERICK E. PARSONS, OF LOS ANGELES, CALIFORNIA.

EYESHADE.

Application filed October 8, 1923. Serial No. 667,234.

This invention relates to an improved type of eye-shade designed for the protection of the eyes from intense light and is particularly directed to an eye-shade of an adjustable character adapted to intercept direct or reflected light rays projected towards the eyes at various angles.

It is an object of the invention to provide an eye-shade which does not obstruct the straight ahead vision of the wearer and which at the same time is capable of circular adjustment around the eye to various positions for intercepting light rays projected towards the eye at various angles relative to the straight ahead vision of the wearer.

A further object is to provide an eyeshade comprising a suitable frame supporting an independent shade member adjacent each eye, with each shade member independently adjustable to relatively similar or different positions around each respective eye, affording protection from light from a single source or from light from more than one source and projected towards the eyes from opposite angles.

Another object is to provide shade members adapted to be associated with the ordinary types of spectacle frame and adjustable mounted therein.

Another object is to provide shade members which are maintained in position by their inherent spring tension.

Various other objects and advantages will be more fully apparent from the following description of the accompanying drawings which form a part of this disclosure, and which illustrate a preferred form of embodiment of the invention.

Of the drawings:

Fig. 1 is a front elevation of the eye-shade of the present invention.

Fig. 2 is a side elevation, partly in section to show certain details of construction.

Fig. 3 is a plan view of one of the shade members before being bent for insertion into the frame.

Fig. 4 is a diagram illustrating several different adjustments of the shade members, and Fig. 5 illustrates a modified form of shade member.

Besides being of exceptional utility for general use as a protection against direct sun rays and sun rays reflected from snow, ice, water, desert, or road surfaces, the eye-shade of the present invention is especially adapted for use by drivers of motor vehicles and water or air craft, and is particularly advantageous in night driving for protecting the eyes of such drivers against the glare of approaching or stationary head-lights, spot lights and other lights of exceptional brightness, also it is of particular benefit to those required to work in the light of searchlights, flood lights, etc., and to camera men, directors and others engaged in picture studios, where numerous high-powered lights are directed upon the set at various angles.

In the drawings the invention is shown as comprising a spectacle frame for supporting a shade member in front of each eye of the wearer. Said frame preferably consist of a bridge 1 attached to adjacent circular bows 2 having hinge extensions 3 to which are pivoted temple-pieces 4 adapted to engage over the ears of the wearer and assist in maintaining the frame in place.

As shown in detail in Fig. 2 the bows 2 have an inner peripheral groove 5 which in the ordinary use of spectacle frames are intended to receive the lenses, but which in the present instance are utilized for the accommodation of the individual shade members or visors 6, each of which has a flanged rear edge providing a bead 7 adapted to engage within the groove 5 of the respective bow 2. Preferably these shade members are cut to the configuration shown in Fig. 3 and are made of transparent or semi-transparent material, such as celluloid, mica, or the like, and are preferably of an amber, blue or other neutral tone or color for the purpose of absorbing or neutralizing actinic light rays. Such material has an inherent spring tension tending when bent to restore the shade members to normal flat shape, therefore, it will be apparent that when in assembling, the shade members are bent to semi-circular form and placed in the bows 2 and then released with the beads 7 engaging within the grooves 5 this outwardly exerted spring tension will frictionally maintain the shade members in position while at the same time permitting circular adjustment thereof.

This construction provides an independent semi-circular shade member, or visor 6 for each eye bow 2, with the opposite or free ends of said shade member extending to or beyond the axial center of the bow so that the shade will not fall out of its retaining groove, and further it provides for the independent circular adjustment of each shade member or visor to any position about the eye to meet various conditions.

It will be evident that as the connecting bridge of the frame obstructs the circular continuity of the outer periphery of each bow, the shade member must be positioned entirely within the circumference thereof in order to be freely adjustable to any position around the eye of the wearer, that is, no portion of the shade member can extend around or hook over the outer surface of the bow in a manner which would prevent complete circular adjustment of the shade member by reason of abutment against the bridge.

The shade members or visors 6 extend forward a suitable distance beyond the supporting frame and are slightly angled inwardly so that the wearer may by a slight inclination or turning of the head direct his gaze through the shades, thereby preventing glare reaching the eyes and securing a substantial protection against dust and high velocity air currents.

In Fig. 5 I have shown a modified form of shade member 6ª in which the bead is formed by a piece of wire 8 secured to the shade member by cement or otherwise, with the free ends of said wire extending to nearly form a complete circle or to form what may be termed a split shade member.

In Fig. 4 the diagram a indicates the most ordinary adjustment of the shade members 6, with both similarly positioned above the eyes, protecting them particularly from the direct rays of a high sun or other elevated source of light, the diagram b indicates the adjustment of each shade member to one side of each respective eye to intercept wide angle light rays shining towards the wearer from one side, and the diagram c indicates a reverse adjustment of each shade member to intercept wide angle light rays coming from the other side of the wearer.

The diagram d indicates an adjustment particularly for intercepting wide angle light rays from separate sources on opposite sides of the wearer, such adjustment being of most demand in picture studios and in night work under batteries of high power search-lights.

The diagram e indicates a shade adjustment in which both shade members 6 are below the eyes, this adjustment being of great value in protecting the eyes from reflected sun rays and particularly polarized rays reflected from snow, ice, water, desert or road surfaces.

The use of this device adjusted as in diagram e will be of great utility in preventing "snow-blindness" and in preventing great injury or strain to the eyes of persons subjected to sun rays reflected from water surfaces, and from the sand surfaces of deserts.

While the device as herein illustrated and described is well adapted to fulfill all of the objects primarily stated, it is to be understood that I do not wish to confine the invention to the form of embodiment herein disclosed, for it is susceptible of embodiment in various other forms all coming within the scope of the following claims.

I claim:

1. An eye-shade comprising a frame having adjacent bows and a connecting bridge, and an independent semi-circular shade visor positioned entirely within the circumference of each respective bow and normally capable of unlimited circular adjustment to different positions around said bow, each shade member being supported entirely by frictional contact with the inner periphery of the respective bow, with its opposite ends engaging said bow at diametrically opposite points.

2. An eye-shade comprising a frame having adjacent bows joined by a connecting bridge and provided with inner peripheral grooves, and an independent semi-circular shade visor positioned entirely within the circumference of each respective bow and normally capable of unlimited circular adjustment to different positions around said bow, each shade member extending at least half way around said bow and being provided with means engaging only within the groove thereof to frictionally maintain the shade member in position.

3. An eye-shade comprising a frame having adjacent bows joined by an intermediate bridge obstructing the circular continuity of the outer periphery of said bows, and an independent semi-circular shade member positioned within each respective bow and capable of unlimited circular adjustment, each shade member engaging only the inner periphery of the respective bow with its opposite ends extending more than half way around said bow, the shade members having an inherent expanding tension maintaining them in position.

4. An eye-shade comprising a frame having adjacent bows joined by an intermediate bridge obstructing the circular continuity of the outer periphery of said bows, said bows being provided with inner peripheral grooves, and an independent semi-circular shade member positioned entirely within each respective bow and freely adjustable circularly therein, each shade member extending more than a half circle around the respective bow and having a bead near its rear margin engaging within the groove thereof, the shade members having an inherent expanding tension maintaining them in the bows.

5. An eye-shade comprising a frame having adjacent bows and a connecting bridge, and an independent split circular shade member freely adjustable within each respective bow, the inner periphery of each bow having a groove and the outer periphery of each shade member having means engaging within said groove, each shade member extending more than half way around the respective bow and having an inherent expanding tension maintaining said means intermeshed within the groove of the said bow.

6. An eye-shade comprising a frame having adjacent circular bows, and independent shade visors, each having means near one marginal edge engaging the inner periphery of the respective bow and capable of unlimited circular adjustment therein, the visors extending at least half way around the bows and exerting an outward tension maintaining them in adjusted position within the bows.

Signed at Los Angeles, California, this 1st day of October, 1923.

FREDERICK E. PARSONS.